United States Patent
Maniar et al.

(10) Patent No.: US 11,978,915 B2
(45) Date of Patent: May 7, 2024

(54) COMBUSTION-POWERED FASTENER DRIVING TOOL FUEL CELL ADAPTER

(71) Applicant: Illinois Tool Works Inc., Glenview, IL (US)

(72) Inventors: Ninad C. Maniar, Gurnee, IL (US); Michael S. Popovich, Bartlett, IL (US); Alex D. Makeyev, Des Plaines, IL (US)

(73) Assignee: Illinois Tool Works Inc., Glenview, IL (US)

(*) Notice: Subject to any disclaimer, the term of this patent is extended or adjusted under 35 U.S.C. 154(b) by 394 days.

(21) Appl. No.: 17/008,946

(22) Filed: Sep. 1, 2020

(65) Prior Publication Data
US 2022/0069266 A1    Mar. 3, 2022

(51) Int. Cl.
*H01M 50/20* (2021.01)
*B25C 1/08* (2006.01)

(52) U.S. Cl.
CPC ............... *H01M 50/20* (2021.01); *B25C 1/08* (2013.01); *H01M 2250/30* (2013.01)

(58) Field of Classification Search
CPC ..... H01M 50/20; H01M 2250/30; B25C 1/08; Y02E 60/10; Y02E 60/50
See application file for complete search history.

(56) References Cited

U.S. PATENT DOCUMENTS

| | | |
|---|---|---|
| D205,691 S | 9/1966 | Ruliffson |
| 4,403,722 A | 9/1983 | Nikolich |
| 4,483,474 A | 11/1984 | Nikolich |
| 4,522,162 A | 6/1985 | Nikolich |
| D294,820 S | 3/1988 | Belletire |
| 5,115,944 A | 5/1992 | Nikolich |
| D405,315 S | 2/1999 | Lioi |
| D420,462 S | 2/2000 | Menter |
| 6,095,704 A | 8/2000 | Jaeger et al. |
| 6,176,412 B1 | 1/2001 | Weinger et al. |
| 6,217,085 B1 | 4/2001 | Toulouse |
| 6,302,297 B1 | 10/2001 | Richardson et al. |
| D457,811 S | 5/2002 | Vanstaan et al. |
| 6,371,338 B1 | 8/2002 | Klein et al. |
| 6,523,860 B1 | 2/2003 | Shkolnikov et al. |

(Continued)

FOREIGN PATENT DOCUMENTS

| | | |
|---|---|---|
| EP | 0278873 A1 | 8/1988 |
| EP | 1254745 | 11/2002 |
| EP | 2815851 | 12/2014 |

OTHER PUBLICATIONS

Paslode Quicklode Fuel Cartridge Image, http://static.grainger.com/rp/s/is/image/Grainger/31EE19_AS01?hei=800&wid=935, Jan. 19, 2016, (1 page).

(Continued)

*Primary Examiner* — Kiran Quraishi Akhtar
(74) *Attorney, Agent, or Firm* — Neal, Gerber & Eisenberg LLP

(57) ABSTRACT

Various embodiments of the present disclosure provide a combustion-powered fastener driving tool fuel cell adapter for a fuel cell for a combustion-powered fastener driving tool, wherein the adapter is configured to reduce the chance of the adapter popping off of a sealing member attached to a fuel cell, wherein the adapter is configured to reduce the chance of the adapter untwisting from the sealing member.

20 Claims, 16 Drawing Sheets

(56) References Cited

U.S. PATENT DOCUMENTS

| | | |
|---|---|---|
| D490,819 S | 6/2004 | Wahlberg |
| 6,796,478 B2 | 9/2004 | Shkolnikov et al. |
| D507,280 S | 7/2005 | Chu et al. |
| 7,302,971 B2 | 12/2007 | Myntti |
| 7,392,922 B2 | 1/2008 | Vanstaan et al. |
| D577,100 S | 9/2008 | Brown |
| D582,437 S | 12/2008 | Shimomura |
| D582,440 S | 12/2008 | Shimomura |
| 7,478,740 B2 | 1/2009 | Shea et al. |
| D590,840 S | 4/2009 | Shea et al. |
| 7,571,841 B2 | 8/2009 | Gibson et al. |
| 7,591,249 B2 | 9/2009 | Wagdy et al. |
| 7,654,429 B2 | 2/2010 | Shea et al. |
| 7,661,568 B2 | 2/2010 | Vanstaan et al. |
| 7,677,420 B1 | 3/2010 | Greer, Jr. |
| 7,757,920 B2 | 7/2010 | Shea et al. |
| D633,922 S | 3/2011 | Shea et al. |
| D645,053 S | 9/2011 | Shea et al. |
| 8,157,130 B2 | 4/2012 | Murayama |
| 8,302,831 B2 | 11/2012 | Taylor et al. |
| D681,677 S | 5/2013 | Shea et al. |
| D721,789 S | 1/2015 | Lu |
| 8,939,339 B2 | 1/2015 | Vanstaan et al. |
| D739,919 S | 9/2015 | Alexander et al. |
| 9,505,509 B2 | 11/2016 | Smith |
| D787,326 S | 5/2017 | Hanson et al. |
| 9,802,303 B2 | 10/2017 | Vanstaan et al. |
| D812,101 S | 3/2018 | Crawford et al. |
| 10,166,666 B2 | 1/2019 | Shea et al. |
| 10,226,614 B2 | 3/2019 | Tumminaro |
| D873,301 S | 1/2020 | Crawford et al. |
| D875,139 S | 2/2020 | Crawford et al. |
| 10,598,377 B2 | 3/2020 | Crawford et al. |
| D903,594 S | 12/2020 | Morehead |
| D903,595 S | 12/2020 | Morehead |
| D903,716 S | 12/2020 | Crawford et al. |
| D975,743 S | 1/2023 | Goos et al. |
| 2004/0206798 A1 | 10/2004 | Robinson |
| 2005/0230451 A1 | 10/2005 | Vanstaan et al. |
| 2007/0251376 A1 | 11/2007 | Toulouse et al. |
| 2007/0251967 A1 | 11/2007 | Taylor et al. |
| 2008/0000451 A1 | 1/2008 | Shea et al. |
| 2008/0110953 A1 | 5/2008 | Gibson |
| 2014/0175143 A1* | 6/2014 | Vanstaan ............ B25C 1/08 227/156 |
| 2016/0045072 A1 | 2/2016 | Myoung |
| 2020/0232642 A1 | 7/2020 | Crawford et al. |

OTHER PUBLICATIONS

Yagid, Rob, "Cordless finish nailer", HowItWorks, the Taunton Press, Inc. Jun./Jul. 2011, (2 pages).

ECKO MultiCell, ECKO Fastening Systems, Available prior to May 27, 2016, (4 pages).

ECKO FuelCell Cordless Fastening System Images, Available prior to May 27, 2016 (3 pages).

Extended European Search Report for European Application No. 21191833.9, dated Mar. 22, 2022 (6 pages).

\* cited by examiner

COMBUSTION-POWERED FASTENER DRIVING TOOL FUEL CELL ADAPTER

CROSS-REFERENCE TO RELATED APPLICATION

This application is related to the following commonly owned co-pending patent application: U.S. application Ser. No. 29/748,790, entitled "COMBUSTION-POWERED FASTENER DRIVING TOOL FUEL CELL ADAPTER."

BACKGROUND

Powered fastener driving tools are well known and commercially widely used throughout the world. Powered fastener driving tools are typically electrically powered, pneumatically powered, combustion-powered, or powder activated. Powered fastener driving tools are typically used to drive fasteners (such as nails, staples, and the like) to connect a first object to a second object.

Various known powered fastener driving tools include: (a) a housing; (b) a power source or supply assembly supported by the housing; (c) a fastener supply assembly supported by the housing; (d) a fastener driving assembly supported by the housing; (e) a trigger mechanism partially supported by the housing; and (f) a workpiece contact element (sometimes referred to herein as a "WCE") supported by the housing. The WCE is configured to contact a workpiece and to operatively work with the trigger mechanism such that the WCE needs to be depressed a predetermined distance with respect to the housing before activation of the trigger mechanism causes actuation of the power fastener driving tool.

Various known powered fastener driving tools have two different types of operational modes and one or more mechanisms that enable the operator to optionally select one of the two different types of operational modes that the operator desires to use for driving the fasteners. One operational mode is known in the industry as the sequential or single actuation operational mode. In this operational mode, the actuation of the trigger mechanism will not (by itself) initiate the actuation of the powered fastener driving tool and the driving of a fastener into the workpiece unless the WCE is sufficiently depressed against the workpiece. In other words, to operate the powered fastener driving tool in accordance with the sequential or single actuation operational mode, the WCE must first be depressed against the workpiece followed by the actuation of the trigger mechanism. Another operational mode is known in the industry as the contact actuation operational mode. In this operational mode, the operator can maintain the trigger mechanism at or in its actuated position, and subsequently, each time the WCE is in contact with, and sufficiently depressed against the workpiece, the power fastener driving tool will actuate, thereby driving a fastener into the workpiece.

As mentioned above, various known powered fastener driving tools are combustion-powered. Various known combustion-powered fastener driving tools are powered by a rechargeable battery pack and a removable and replaceable fuel cell.

Two different types of combustion-powered fastener driving tools are well known. A first well known type of combustion-powered fastener driving tool is often referred to as an "on-can" tool that uses a fuel cell to deliver the appropriate amount of fuel to the tool. Fuel cells configured for use with external metering valves are of the "on-can" type. A second well known type of combustion-powered fastener driving tool is often referred to as an "in-can" tool that uses a fuel cell to deliver the appropriate amount of fuel to the tool. Fuel cells that have internal metering valves are of the "in-can" type. Such fastener driving tools and fuel cells have been available commercially from ITW-Paslode of Vernon Hills, Illinois (a division of Illinois Tool Works Inc., the assignee of this disclosure).

Various fuel cells can be used with a metering valve for an on-can type combustion-powered fastener driving tool. These same fuel cells can be used with fuel cell adapters for use with an in-can type combustion-powered fastener driving tool. To attach a fuel cell adapter to a fuel cell, the operator inserts the fuel cell adapter into a sealing member attached to the fuel cell and rotates the fuel cell adapter relative to the sealing member until grooves of the sealing member receive corresponding locking member of the fuel cell adapter.

One such known fuel cell adapter is shown in FIGS. 1 and 2. This known fuel cell adapter 10 generally includes: (1) a hub 20; (2) a flange 40 connected to and extending radially outwardly from the hub 20; (3) a collar 60 connected to and longitudinally extending upwardly from the hub 20; and (4) a flexible suspension 80 connecting the collar 60 to the hub 20. This known fuel cell adapter is described in more detail in U.S. Pat. No. 9,802,303. In certain instances, this known fuel cell adapter 10 may not be suitably securely attachable to a sealing member that is attached to a fuel cell. In particular, in certain instances this known fuel cell adapter may pop off from the sealing member and the fuel cell. In certain instances this known fuel cell adapter may twist off from the sealing member and the fuel cell at an undesired point in time. In certain instances, this known fuel cell adapter may cause a fastener driving tool to not receive an appropriate dose of fuel.

Accordingly, there is a need to provide a fuel cell adapter that is more securely attachable to a sealing member attached to a fuel cell.

SUMMARY

Various embodiments of the present disclosure provide a combustion-powered fastener driving tool fuel cell adapter for a fuel cell for a combustion-powered fastener driving tool that solves the above problems. Various embodiments of the present disclosure provide a combustion-powered fastener driving tool fuel cell assembly including a fuel cell and the fuel cell adapter. Various embodiments of the present disclosure provide a combustion-powered fastener driving tool fuel cell assembly including a fuel cell, a sealing member, and the fuel cell adapter. The fuel cell adapter of various embodiments of the present disclosure enables the fuel cell adapter to be more securely removably attached to the fuel cell, and particularly more securely removably attached to the sealing member attached to the fuel cell.

In various example embodiments, the fuel cell adapter of the present disclosure generally includes: (1) a hub; (2) a flange connected to and extending radially outwardly from the hub; (3) a collar connected to and longitudinally extending upwardly from the hub; and (4) a flexible suspension connecting the collar to the hub. This fuel cell adapter includes a combination of changes to the hub and flange that individually and collectively co-act to produce unexpected results in the performance of this fuel cell adapter over the fuel cell adapter shown in FIGS. 1 and 2 and described in U.S. Pat. No. 9,802,303.

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
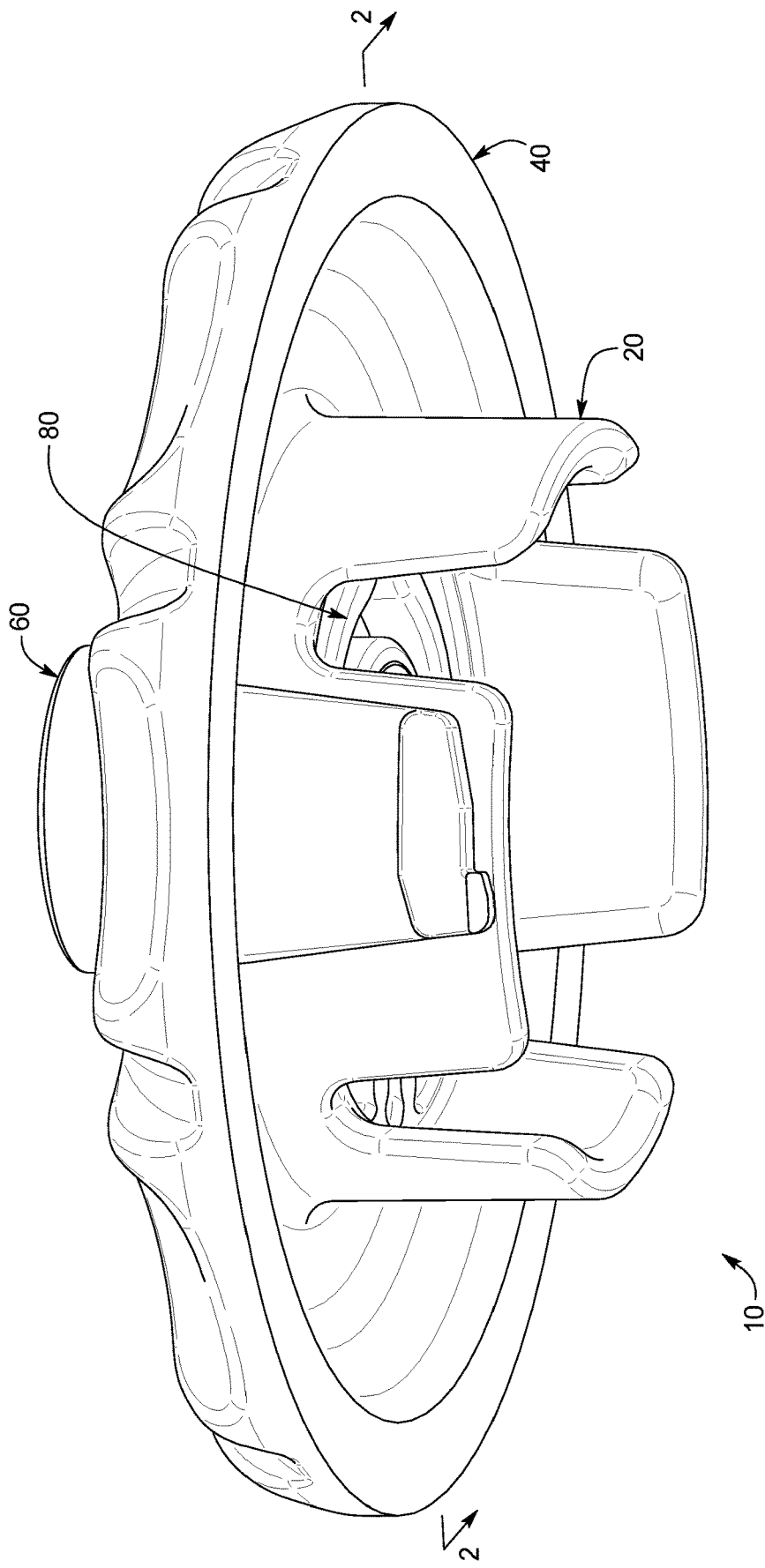
FIG. 1 is a bottom perspective view of a known fuel cell adapter.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Referring now further to the drawings, a combustion-powered fastener driving tool fuel cell adapter 100 of one example embodiment of the present disclosure is generally shown in FIGS. 3, 4, 5, 6, 7, 8, 9, 10, 11, 12, 15, and 16. The fuel cell adapter 100 is configured to attached to a fuel cell 1000, and particularly to a sealing member 1500 (that is sometimes called a sealing ring) attached to the fuel cell 1000 as shown in FIGS. 13, 14, 15, and 16.

In various example embodiments of the present disclosure, the combustion-powered fastener driving tool fuel cell 1000 includes a housing 1010 having: (a) a substantially cylindrical upright fuel cell wall 1020 having an upper lip 1030 defining an open upper end (not labeled); (b) a lower end wall 1100 connected to the bottom of the fuel cell wall 1020; and (c) a closure 1200 sealingly secured to the upper lip 1030. In various example embodiments of the present disclosure, the combustion-powered fastener driving tool fuel cell 1000 further includes a stem assembly 1400 having a fuel valve stem (not labeled) that partially extends from the housing 1010 through the closure 1200 and through the sealing member 1500. The stem assembly 1400 includes a suitable biasing element (not labeled) that biases the fuel valve stem to a closed or resting position. When the fuel valve stem is depressed axially inwardly relative to the housing 1010 (i.e., toward the lower end wall 1100 of the housing 1010), a measured dose of fuel (not shown) is dispensed from the fuel metering chamber (not labeled) out through the fuel valve stem. Upon release of this axial inward force, the biasing element (not labeled) of the stem assembly 1400 returns the fuel valve stem to the closed or resting position, and a subsequent dose of fuel flows into the fuel metering chamber for the next ignition or firing cycle. Certain example fuel cells are further described in U.S. Pat. Nos. 7,392,922 and 7,581,249.

In various example embodiments of the present disclosure, the sealing member 1500 includes an outer ring 1510 configured to engage and grip the closure 1200 such that the sealing member 1510 is attached to and not rotatable relative to the closure 1200 and the housing 1010. The outer ring 1510 includes a top edge 1520, a bottom edge 1530, an outer sidewall 1540, and an inner sidewall 1550. The inner sidewall 1550 defines a plurality of grooves (not labeled) configured to receive opposing outwardly extending locking members 300 and 350 of the fuel cell adapter 100, as explained below.

The illustrated example combustion-powered fastener driving tool fuel cell adapter 100 is configured, for example, for use with an in-can type combustion fastener driving tool (not shown). An in-can type combustion fastener driving tool can include, for example, a housing having a combustion chamber and a fuel cell chamber configured to receive an in-can fuel cell such as the fuel cell 1000 with the fuel cell adapter 100 and the sealing member 1500. Such an in-can type combustion fastener driving tool can include a fuel cell door pivotally connected to the housing and configured to open and close the fuel cell chamber. Such an in-can type combustion fastener driving tool can further include a fuel cell actuator assembly pivotally connected to the housing and having an actuator configured to exert an axial force on a fuel cell valve stem of the stem assembly 1400. This axial force causes the fuel cell 1000 to dispense a measured dose of fuel through the valve stem and into the combustion chamber before each combustion event to initiate combustion. The actuator assembly can include an actuator block that delivers fuel to a fuel conduit and ultimately to the combustion chamber. In certain such in-can type combustion fastener driving tools, retraction of the WCE activates the actuator assembly. More specifically, as the WCE is pressed against a workpiece before driving a fastener, the WCE retracts relative to a nosepiece of the tool. This retraction mechanically triggers certain operations of the tool, such as the closing of the combustion chamber. In certain such combustion-powered fastener driving tools, the movement of the WCE relative to the nosepiece initiates the axial force on the fuel valve stem to dispense the fuel.

The illustrated example fuel cell adapter 100 is removably attachable to the fuel cell 1000 such that a user can remove the fuel cell adapter 100 from the fuel cell 1000 to enable use of the fuel cell 1000 with a metering valve (not shown) of an on-can type combustion fastener driving tool (not shown).

More specifically, the illustrated example fuel cell adapter 100 includes: (1) an annular hub 200; (2) an annular locking flange 400 integrally connected to and extending radially outwardly from the hub 200; (3) an annular collar 600 integrally connected to and longitudinally extending upwardly from the hub 200; and (4) a flexible suspension 800 integrally connecting the collar 600 to the hub 200. In this illustrated example embodiment of the present disclosure, the entire fuel cell adapter 100 including the hub 200, the locking flange 400, the collar 600, and the flexible suspension 800 are monolithically formed such as via a suitable molding process. In this illustrated example embodiment of the present disclosure, the fuel cell adapter 100 can be made (such as molded) from any suitable material or materials such as a suitable plastic material. In this illustrated example embodiment of the present disclosure, the fuel cell adapter 100 is made from polyoxymethylene acetal resin.

More specifically, the hub 200 includes: (1) a generally tubular body 202 having a tubular waist 206 (best shown in FIGS. 11 and 12) and four legs 210, 220, 230, and 240 (best shown in FIGS. 4, 5, 6, 7, 8, 11, and 12) integrally connected to and extending downwardly from the tubular waist 206; (2) a first reinforcement member 250 (best shown in FIG. 12) integrally connected to and extending inwardly from the first leg 210; (3) a second reinforcement member 260 (best shown in FIGS. 4, 11, and 12) integrally connected to and extending inwardly from the third leg 230; (4) a first locking member 300 (best shown in FIGS. 4, 5, 7, 8, and 12) integrally connected to and extending outwardly from the first leg 210; and (5) a second locking member 350 (best shown in FIGS. 6, 7, 8, and 12) integrally connected to and extending outwardly from the third leg 230.

Figure 4:
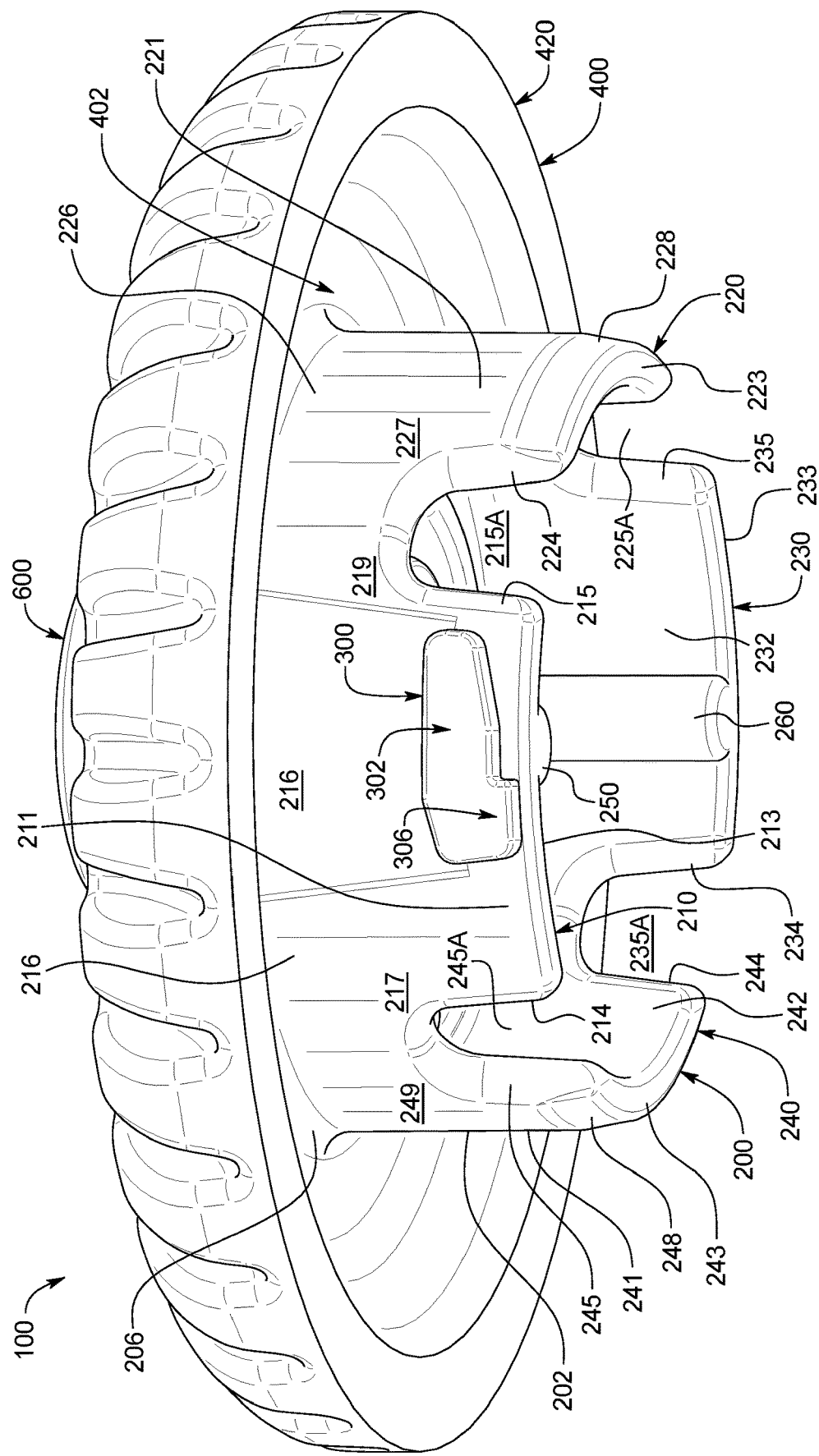
FIG. 4 is a bottom perspective view of the fuel cell adapter of FIG. 3.
Figure 5:
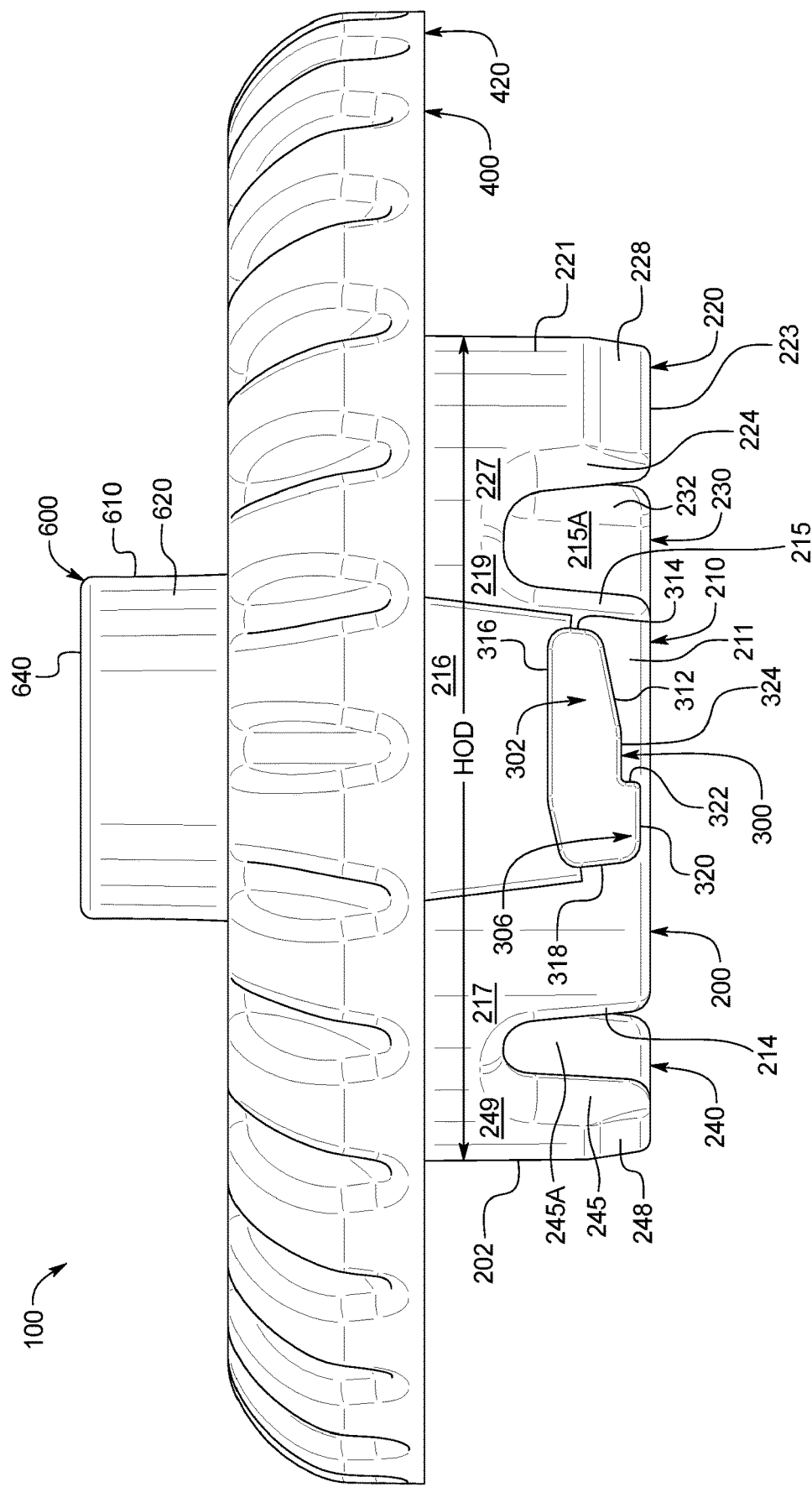
FIG. 5 is a front view of the fuel cell adapter of FIG. 3.
Figure 6:
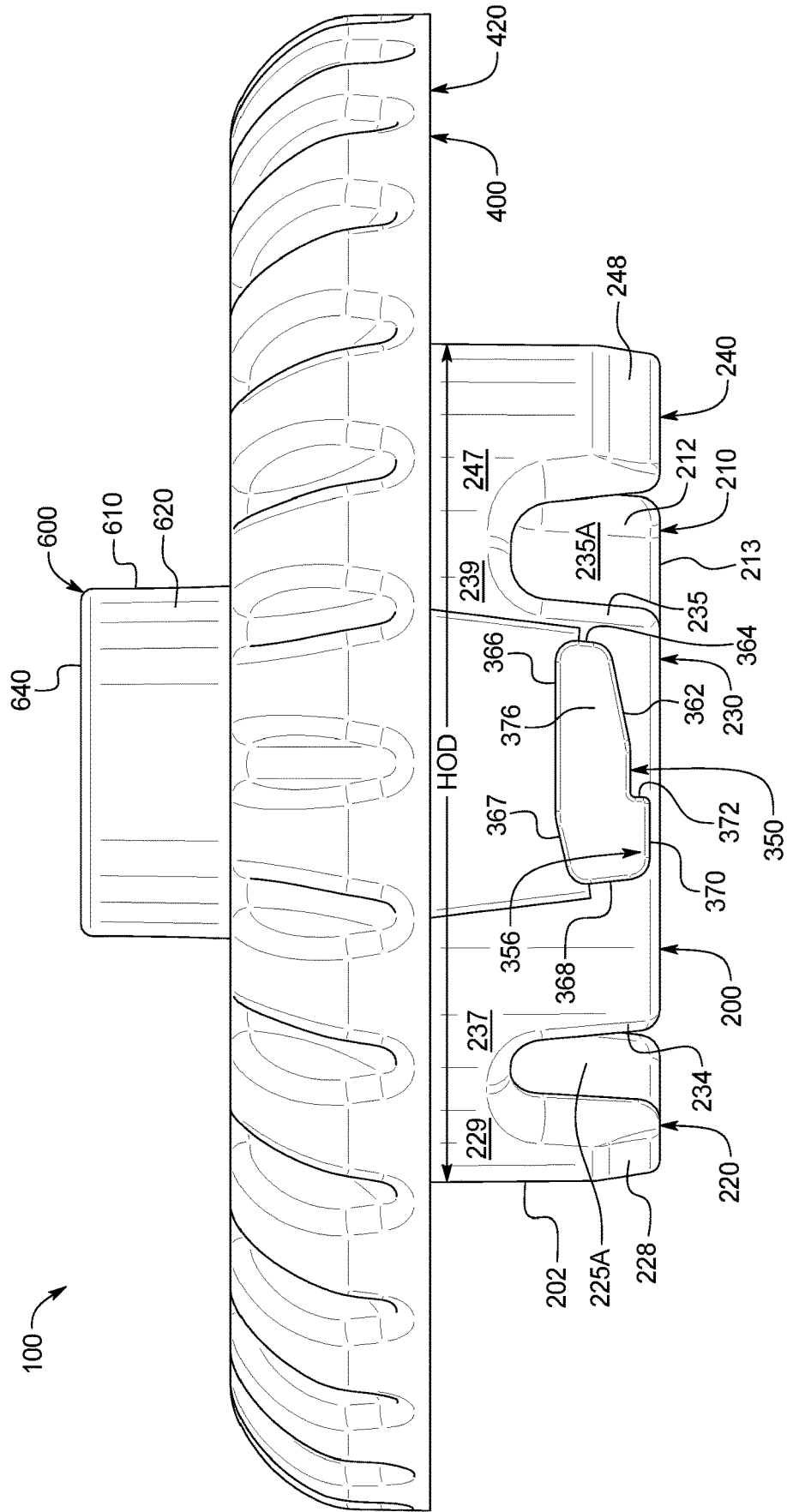
FIG. 6 is a back view of the fuel cell adapter of FIG. 3.
Figure 7:
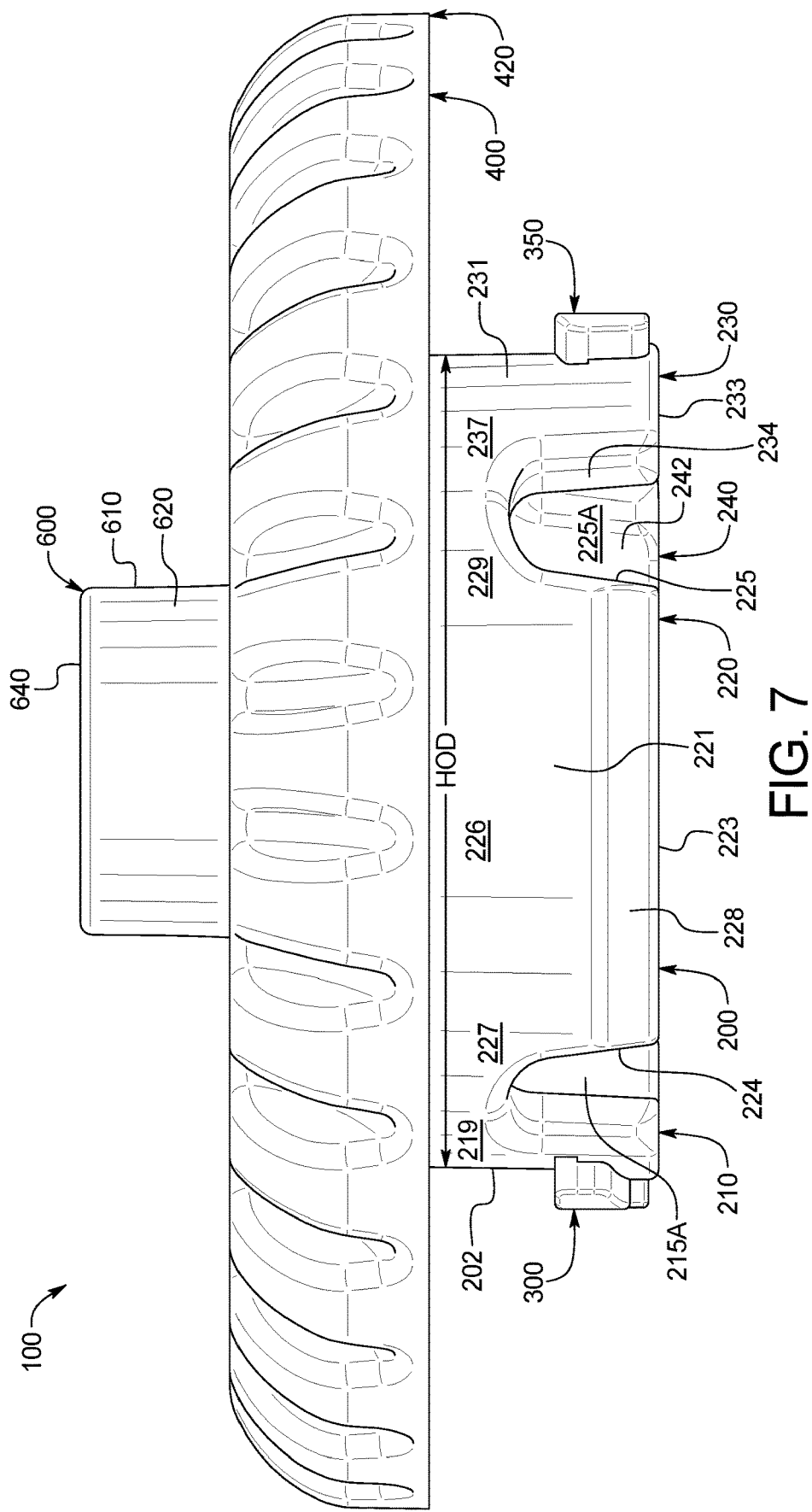
FIG. 7 is a first side view of the fuel cell adapter of FIG. 3.
Figure 8:
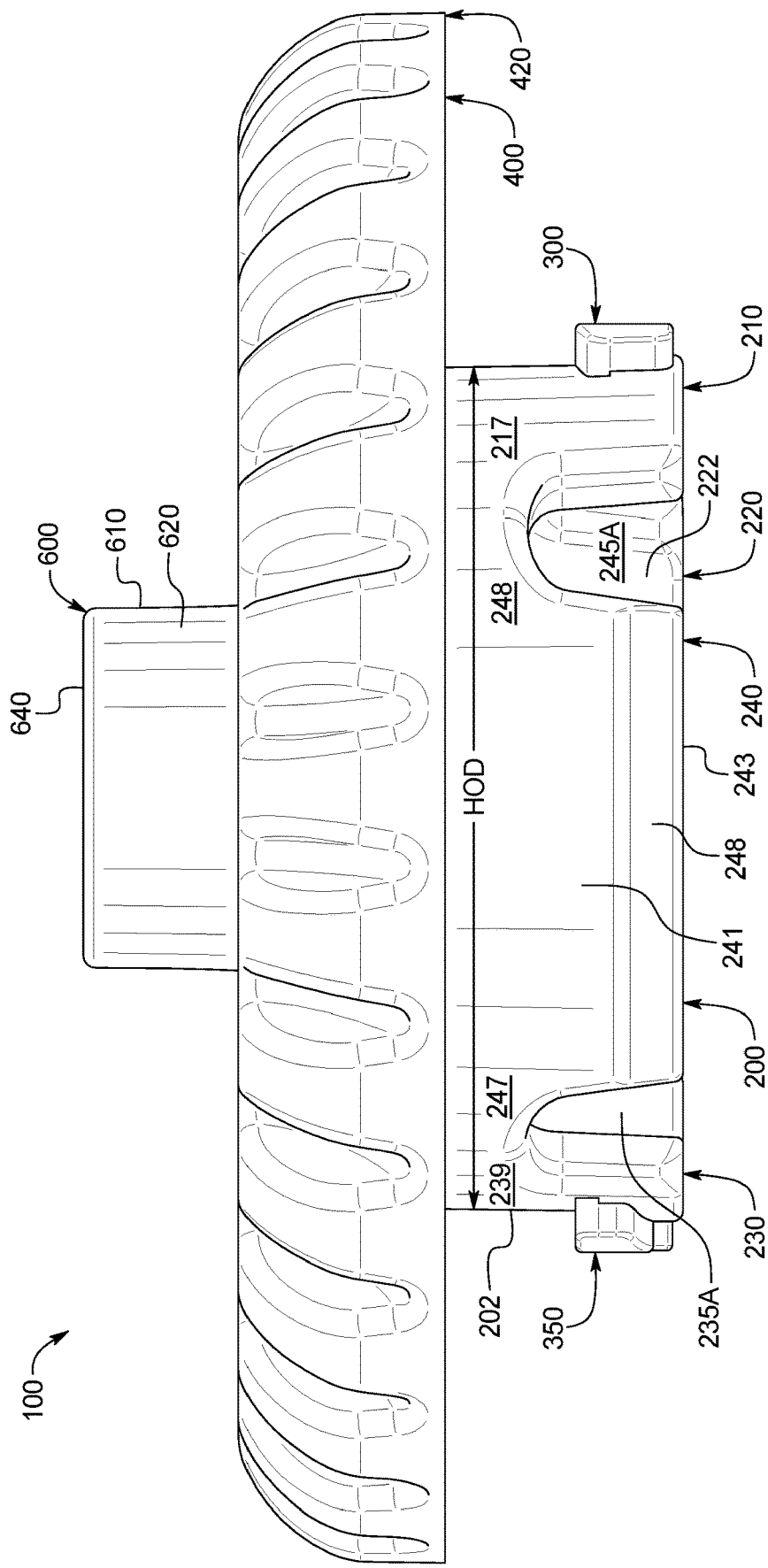
FIG. 8 is a second side view of the fuel cell adapter of FIG. 3.
Figure 9:
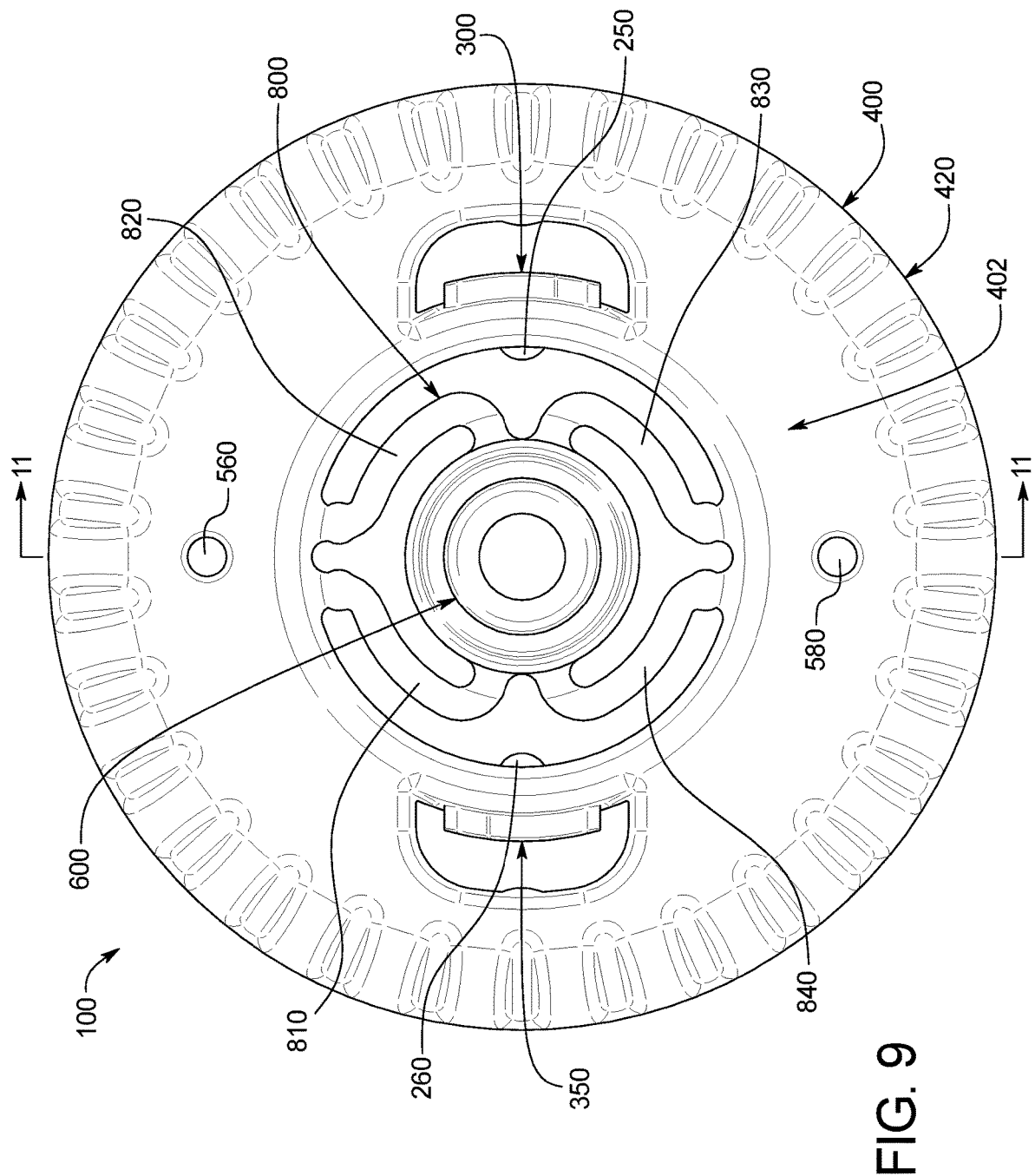
FIG. 9 is a top view of the fuel cell adapter of FIG. 3.
Figure 10:
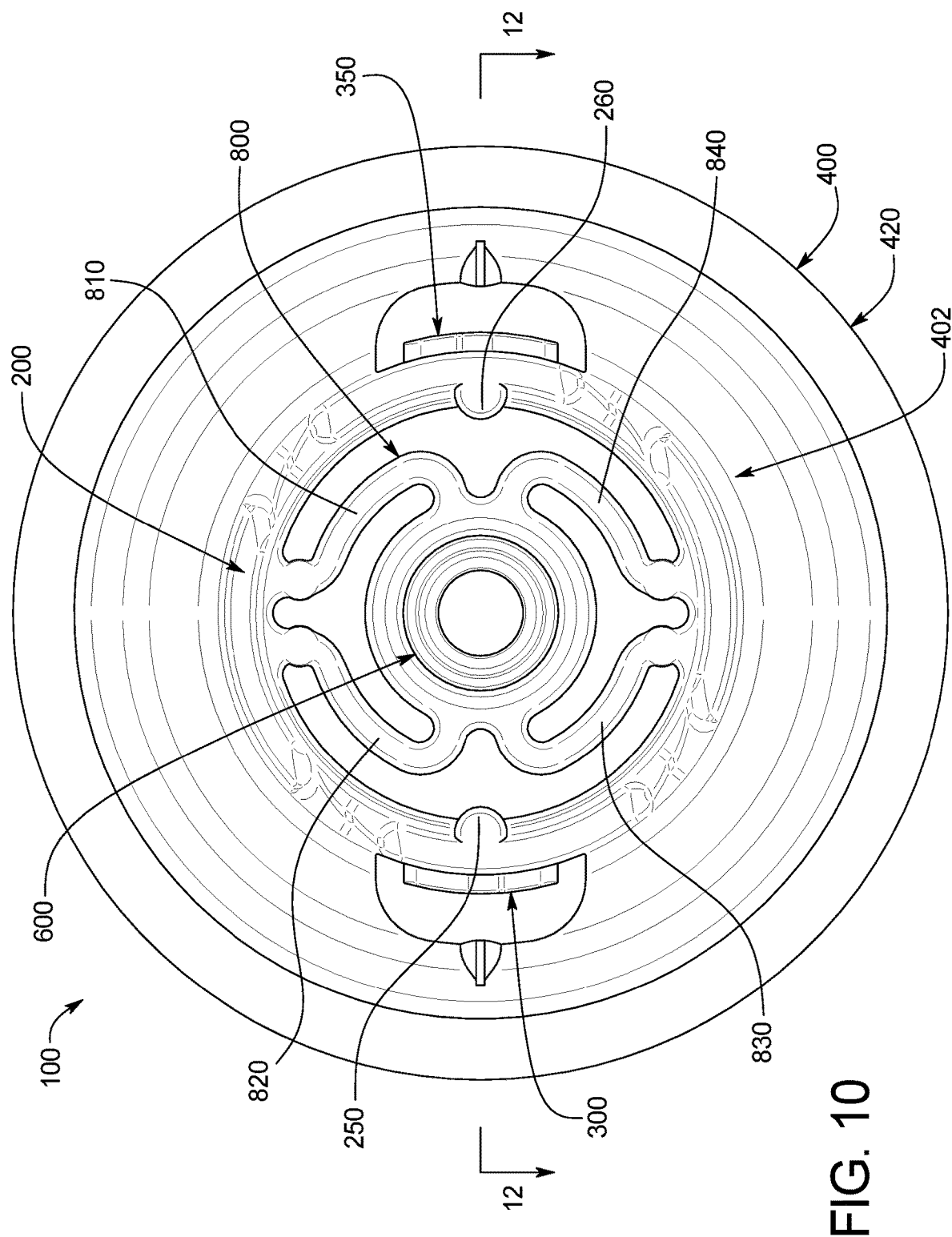
FIG. 10 is a bottom view of the fuel cell adapter of FIG. 3.

As best shown in FIGS. 4, 5, and 6, the first leg 210 includes an outer surface 211, an inner surface 212, a bottom edge 213, a first side surface 214, a second side surface 215, and a top portion 216. Likewise, as best shown in FIGS. 4, 5, 7, and 8, the second leg 220 includes an outer surface 221, an inner surface 222, a bottom edge 223, a first side surface 224, a second side surface 225, and a top portion 226. Likewise, as best shown in FIGS. 4, 5, 6, and 7, the third leg 230 includes an outer surface 231, an inner surface 232, a bottom edge 233, a first side surface 234, a second side surface 235, and a top portion 236. Likewise, as best shown in FIGS. 4, 5, 7, and 8, the fourth leg 240 includes an outer surface 241, an inner surface 242, a bottom edge 243, a first side surface 244, a second side surface 245, and a top portion 246.

Figure 2:
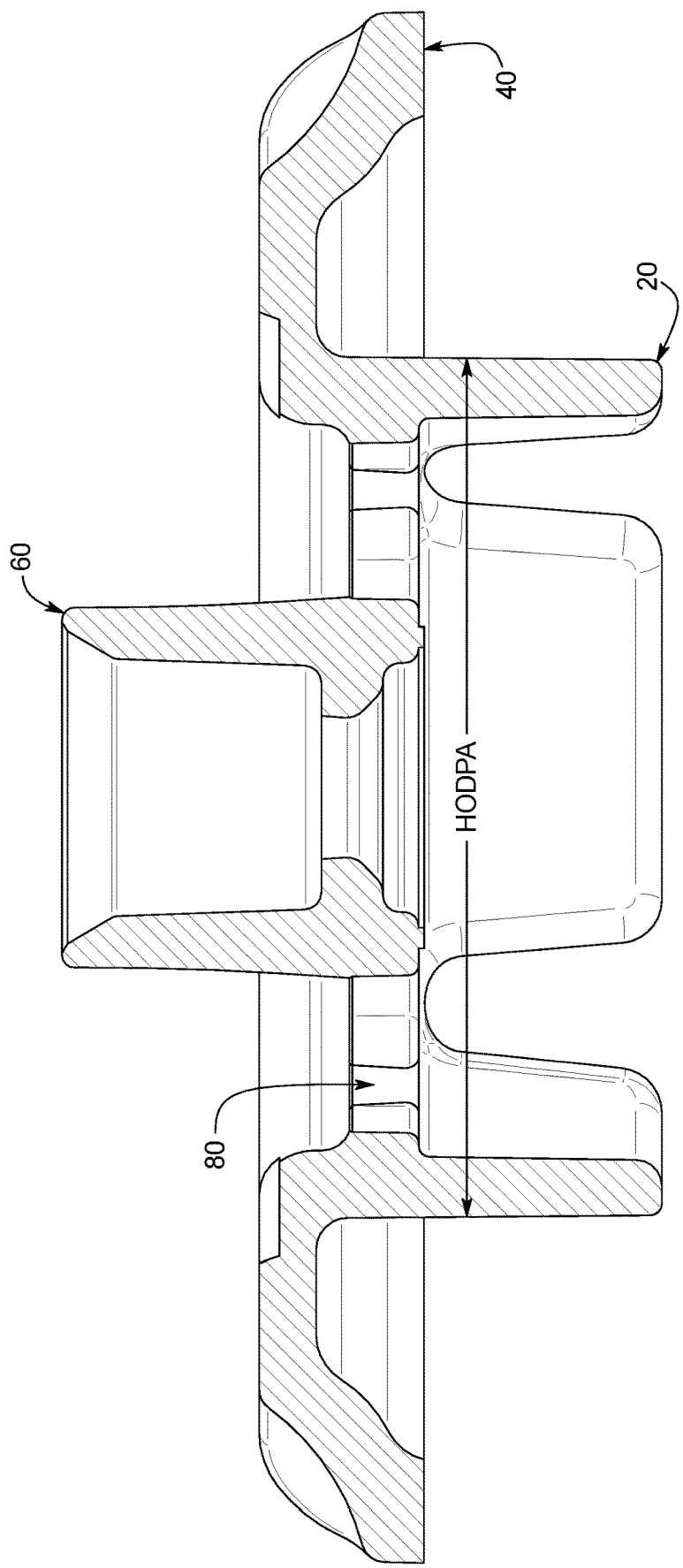
FIG. 2 is a cross-sectional view of the known fuel cell adapter of FIG. 1 taken substantially along line 2-2 of FIG. 1.
Figure 3:
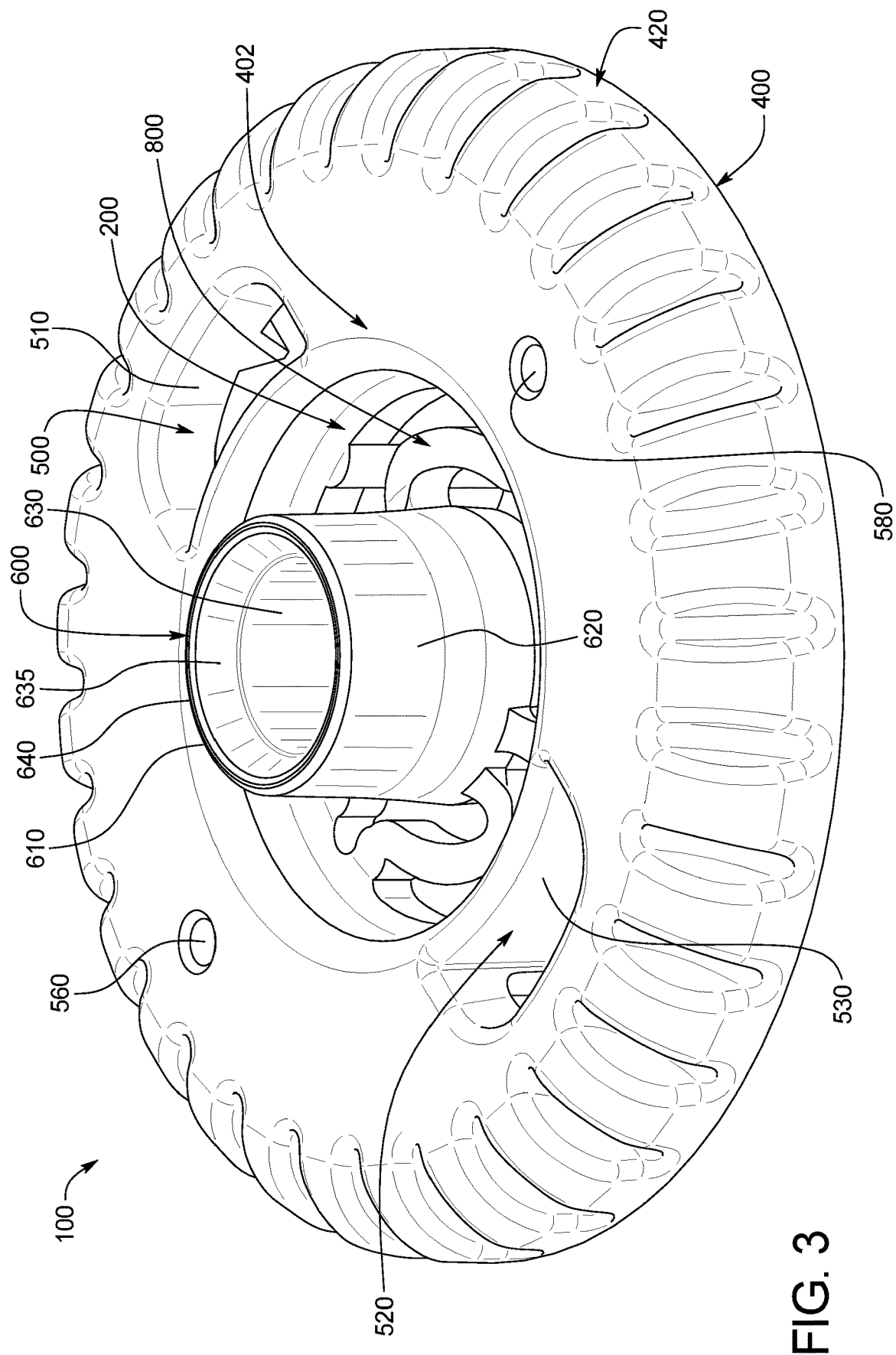
FIG. 3 is a top perspective view of one example embodiment of a fuel cell adapter of the present disclosure.

The four legs 210, 220, 230, and 240, and particularly the respective outer surfaces 211, 221, 231, and 241 of the four legs 210, 220, 230, and 240 have or define an outer diameter of the hub 200 labeled HOD. The outer diameter of the hub 200 HOD of the adapter 100 is larger than the outer diameter of the hub 20 labeled HODPA of the prior art adapter 10 shown in FIGS. 1 and 2. This larger hub outer diameter creates a tighter and more secure fit with the sealing member 1500 when the adapter 100 is attached to the sealing member 1500 that is attached to the fuel cell 1000. In this illustrated example embodiment, the outer diameter HOD of the hub 200 of the adapter 100 has been increased to 0.843±0.002 inches (2.141±0.005 cms) from the outer diameter (labeled HODPA) of the hub 20 of the prior art adapter 10 that is 0.832±0.005 inches (2.113±0.0127 cms). Increasing the hub 200 HOD reduces the tolerance between the hub 200 and the inner side wall 1550 of the sealing member 1500 and thus creates a tighter fit with the sealing member 1500 when the adapter 100 is attached to the sealing member 1500 and the fuel cell 1000. This increased hub 200 HOD substantially assists in preventing the adapter 100 from popping off of the fuel cell 1000 and particularly off of the sealing member 1500 when the adapter 100 is attached to the sealing member 1500 and the fuel cell 1000. This increased hub 200 HOD substantially assists in preventing the adapter 100 from untwisting relative to the sealing member 1500 (which could prevent the fuel cell from dosing fuel to the tool).

The present disclosure further certain provides modifications to two of the legs to compensate for this larger HOD by providing mechanisms for assisting in the insertion of the hub 200 into the sealing member 1500. More specifically, in this illustrated example embodiment, the leg 220 includes an inwardly extending lead-in outer chamfer 228 (best shown in FIGS. 4, 5, 6, 7, and 11) defined by the outer surface 221, the bottom edge 223, the first side surface 224, and the second side surface 225 of the leg 220. Likewise, in this illustrated example embodiment, the leg 240 includes inwardly extending lead in outer chamfer 248 (best shown in FIGS. 4, 5, 6, 8, and 11) defined by the outer surface 241, the bottom edge 243, the first side surface 244, and the second side surface 245 of the leg 240. These lead-in chamfers 228 and 248 formed in these two legs 220 and 240 assist in the insertion of the hub 200 into the sealing member 1500. More specifically, these lead-in chamfers 228 and 248 formed in these two legs 220 and 240 assist in or cause the inward flexing of the legs 220 and 240 during the insertion process. It should be appreciated that in this illustrated example embodiment of the present disclosure, legs 210 and 230 do not include such lead-in chamfers 228 and 248. It should also be appreciated that in this illustrated example embodiment of the present disclosure the legs 220 and 240 with the lead-in chamfers are not the legs 210 and 230 with the outwardly extending locking members 300 and 330. It should further be appreciated that in this illustrated example embodiment of the present disclosure the legs 220 and 240 with the lead-in chamfers are not the legs 210 and 230 with the reinforcement ribs 250 or 260. It should thus be appreciated that the legs 220 and 240 are more configured to flex inwardly during insertion than legs 210 and 230; and thus legs 220 and 240 are more configured to enable legs 210 and 230 and the locking members 300 and 350 to suitably engage the sealing member 1500.

The present disclosure further provides additional modifications to the hub 200 for assisting in maintaining the fuel cell adapter 100 in the sealing member 1500. The four legs 210, 220, 230, and 240 define a plurality of slots 215A, 225A, 235A, and 245A as best seen in FIGS. 4, 5, 6, 7, 8, 11, and 12. Specifically, (1) legs 210 and 220 define slot 215A; (2) legs 220 and 230 define slot 225A; (3) legs 230 and 240 define slot 235A; and (4) legs 240 and 210 define slot 245A. These slots 215A, 225A, 235A, and 245A are each shorter than the respective slots (not labeled) defined by the legs in the prior art adapter 10 shown in FIGS. 1 and 2. These slots 215A, 225A, 235A, and 245A allow for a desired amount of cylindrical inward flexing of the legs 210, 220, 230 and 240 of the hub 200 of the adapter 100 to account for different tolerances of the fuel cell 1000, the closure 1200 of the fuel cell, and the sealing member 1500. In other words theses slot allow the legs to flex inwardly when needed for tighter fitting closures fuel cells, closures 1200, and sealing members. These slots 215A, 225A, 235A, and 245A each have a reduced slot height to 0.150±0.005 inches (0.381±0.0127 cms) for the adapter 100 from a slot height 0.230±0.010 inches (0.584±0.0254 cms) of the hub 20 of the prior art adapter 10. This reduced slot height enables each of the legs 210, 220, 230, and 240 to have additional supporting sections as best shown in FIGS. 4, 5, 6, 7, and 8 and respectively labeled: (a) 217 and 219 for leg 210; (b) 227 and 229 for leg 210; (c) 237 and 239 for leg 230; and (d) 247 and 249 for leg 240. More specifically, these additional supporting sections 217, 219, 227, 229, 237, 239, 247, and 249 each have an increased height (upward from the apex of slot) to 0.185±0.010 inches (0.4699±0.0254 cms) for the adapter 100 from a height 0.105±0.010 inches (0.2667±0.0254 cms) of the hub 20 of the prior art adapter 10. These additional supporting sections 217, 219, 227, 229, 237, 239, 247, and 249 increase the rigidity of the upper portions of the respective legs 210, 220, 230, and 240 and the connections between the respective legs 210, 220, 230 and 240, thus increasing the overall rigidity of the hub 200 where needed. This increased rigidity of the hub 200 reduces the likelihood that the hub 200 will flex radially inwardly in an undesired manner when it is positioned in the sealing member 1500, and thus provides the adapter 100 with a tighter fit in the sealing member 1500 and to the fuel cell 1000 once assembled and in use. These reduced height slots 215A, 225A, 235A, and 245A also assist in preventing the adapter 100 from: (a) popping off from the sealing member 1500 and the fuel cell 1000; and (b) untwisting from the sealing member 1500 and the fuel cell 1000. It should thus be appreciated that the present disclosure accounts for both assembly and us tolerances and forces.

The present disclosure further provides additional modifications to the hub 200 for assisting in maintaining the fuel cell adapter 100 in the sealing member 1500. More specifically, as mentioned above, the hub 200 further includes: (a) a first reinforcement rib 250 integrally connected to and extending inwardly from the first leg 210; and (b) a second reinforcement rib 260 integrally connected to and extending inwardly from the third leg 230. The first reinforcement rib 250 is semi-cylindrical and extends from the bottom edge 213 of the first leg 210 to the waist 206 of the hub 200. Likewise, the second reinforcement rib 260 is semi-cylindrical and extends from the bottom edge 233 of the third leg 230 to the waist 206 of the hub 200. The first reinforcement rib 250 and the second reinforcement rib 260 reduce the radially inwardly flexing of the adapter 100 to account for different tolerances of the fuel cell 1000, the closure 1200 of the fuel cell, and the sealing member 1500. The first reinforcement rib 250 and the second reinforcement rib 260 reduce the inward flexing of the legs 210 and 230 and provide the hub 200 and the adapter 100 a tighter fit in the sealing member 1500 and on the fuel cell 1000 once assembled and in use. The first reinforcement rib 250 and the second reinforcement rib 260 also assist in preventing the adapter 100 from: (a) popping off from the sealing member 1500 and the fuel cell 1000; and (b) untwisting from the sealing member 1500 and the fuel cell 1000. It should also be appreciated that in this illustrated example embodiment of the present disclosure the legs 220 and 240 do not have reinforcement ribs. It should be appreciated that the shapes and configuration of the reinforcement ribs may vary in accordance with the present disclosure.

The present disclosure further provides additional modifications to the hub 200 for assisting in maintaining the fuel cell adapter 100 in the sealing member 1500. The first locking member 300 that is integrally connected to and that extends outwardly from the first leg 210 and the second locking member 350 that is integrally connected to and that extends outwardly from the third leg 230 are modified (from the locking members in the prior art adapter 10) in a plurality of different ways.

The first locking member 300 includes a foot 302 and a toe 306 integrally connected to and extending outwardly from the first leg 210. As best seen in FIG. 5, the first locking member 300 has: (a) a first bottom surface 312; (b) a first side surface 314; (c) a first top surface 316; (d) a second top surface 317; (e) a second side surface 318; (f) a second bottom surface 320; (g) a third bottom surface 322; (h) a fourth bottom surface 324; and (i) an outer surface 326. The toe 306 is wider (from surface 318 to surface 322) than the toe of the prior art adapter 10, and does not include a chamfer at its bottom portion like the toe of the prior art adapter 10.

Likewise, the second locking member 350 includes a foot 352 and a toe 356 integrally connected to and extending outwardly from the third leg 230. As best seen in FIG. 6, the first locking member 350 has: (a) a first bottom surface 362; (b) a first side surface 364; (c) a first top surface 366; (d) a second top surface 367; (e) a second side surface 368; (f) a second bottom surface 370; (g) a third bottom surface 372; (h) a fourth bottom surface 374; and (i) an outer surface 376. The toe 356 is wider (from surface 368 to surface 372) than the toe of the prior art adapter 10, and does not include a chamfer at its bottom portion like the toe of the prior art adapter 10.

The portions of the molds that that are employed to form the first locking member 300 and the second locking member 350 each have reduced tolerances and more pronounced definitions to form each respective foot and toe. This enables the mold to more consistently produce these locking members. This overcomes the issue with certain prior adapters where the molds tend to wear out in these areas and produce locking member with less pronounced shapes. More specifically, the respective edges between the outer surface 326 and each of: (a) the first bottom surface 312; (b) the first side surface 314; (c) the first top surface 316; (d) the second top surface 317; (e) the second side surface 318; (f) the second bottom surface 320; (g) the third bottom surface 322; (h) the fourth bottom surface 324, for each adapter 100 produced by the new molds are each more pronounced. Likewise, the respective edges between the outer surface 366 and each of: (a) the first bottom surface 362; (b) the first side surface 364; (c) the first top surface 366; (d) the second top surface 367; (e) the second side surface 368; (f) the second bottom surface 370; (g) the third bottom surface 372; (h) the fourth bottom surface 374, for each adapter 100 produced by the new molds are each more pronounced.

The first locking member 300 and the second locking member 350 assist in inserting the adapter 100 into the sealing member 1500 and engaging the locking member receipt areas of the sealing member 1500 to establish a secure connection of the adapter 100 in the sealing member 1500. The first locking member 300 and the second locking member 350 assist in locking the adapter 100 in the sealing member 1500 and holding it in place once assembled. The first locking member 300 and the second locking member 350 thus provide the hub 200 and the adapter 100 with a tighter and more secure fit of the adapter 100 in the sealing member 1500 and on the fuel cell 1000 once assembled and in use. The first locking member 300 and the second locking member 350 also assist in preventing the adapter 100 from: (a) popping off from the sealing member 1500 and the fuel cell 1000; and (b) untwisting from the sealing member 1500 and the fuel cell 1000.

The locking flange 400 extends radially outwardly from the top portion 210 of the hub 202. The locking flange 400 is generally ring-shaped in this illustrated example embodiment. The locking flange 400 includes: (a) an inner annular section 402 integrally connected to and extending radially outwardly from the hub 200; and (b) an outer annular section 410 integrally connected to and extending radially outwardly from the entire inner annular section 402. The outer annular section 420 extends further downwardly (in the same directions as the legs 210, 220, 230, and 240) than the inner annular section 402.

Figure 11:
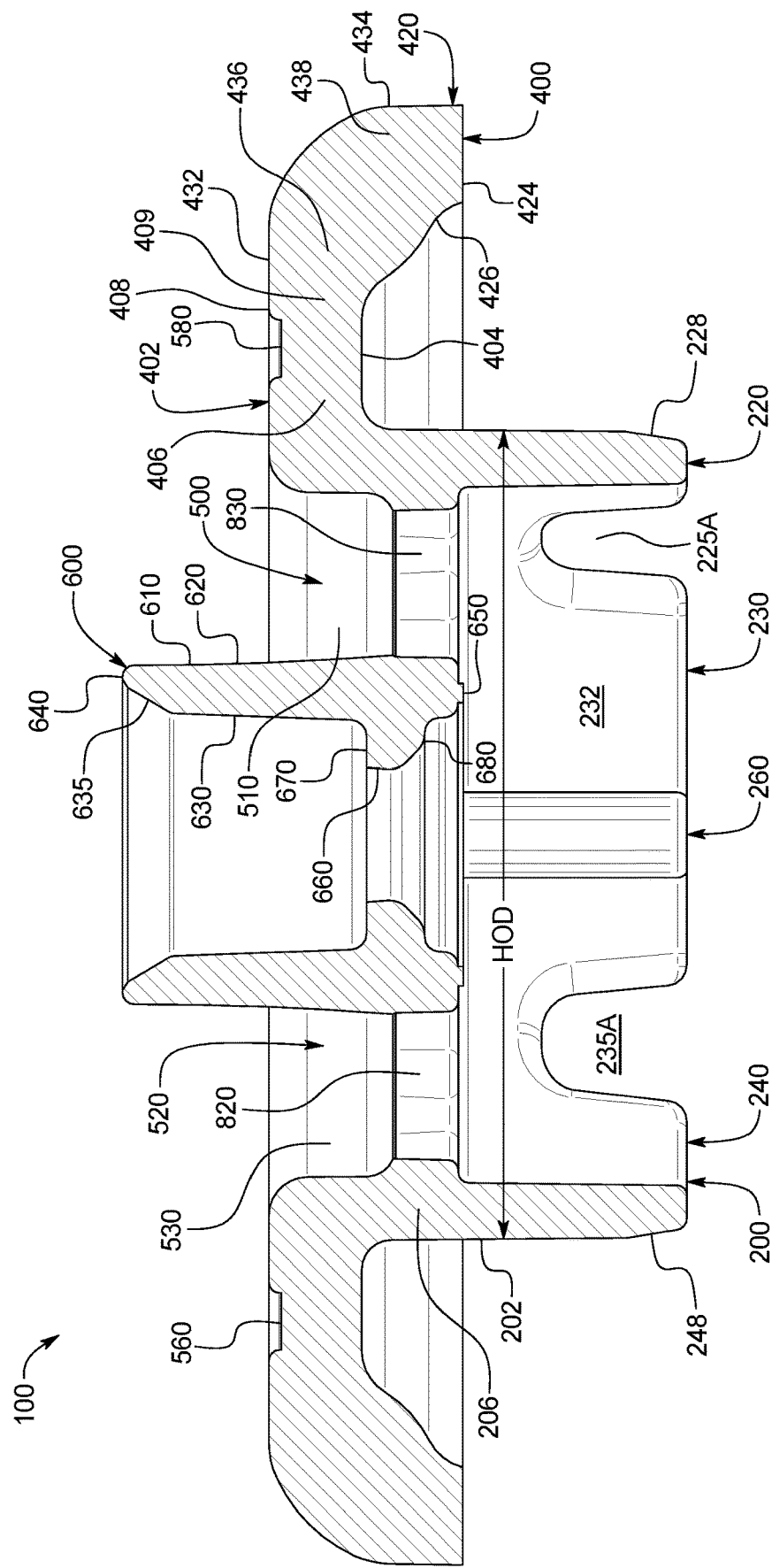
FIG. 11 is a cross-sectional view of the fuel cell adapter of FIG. 3, taken substantially along line 11-11 of FIG. 5.
Figure 12:
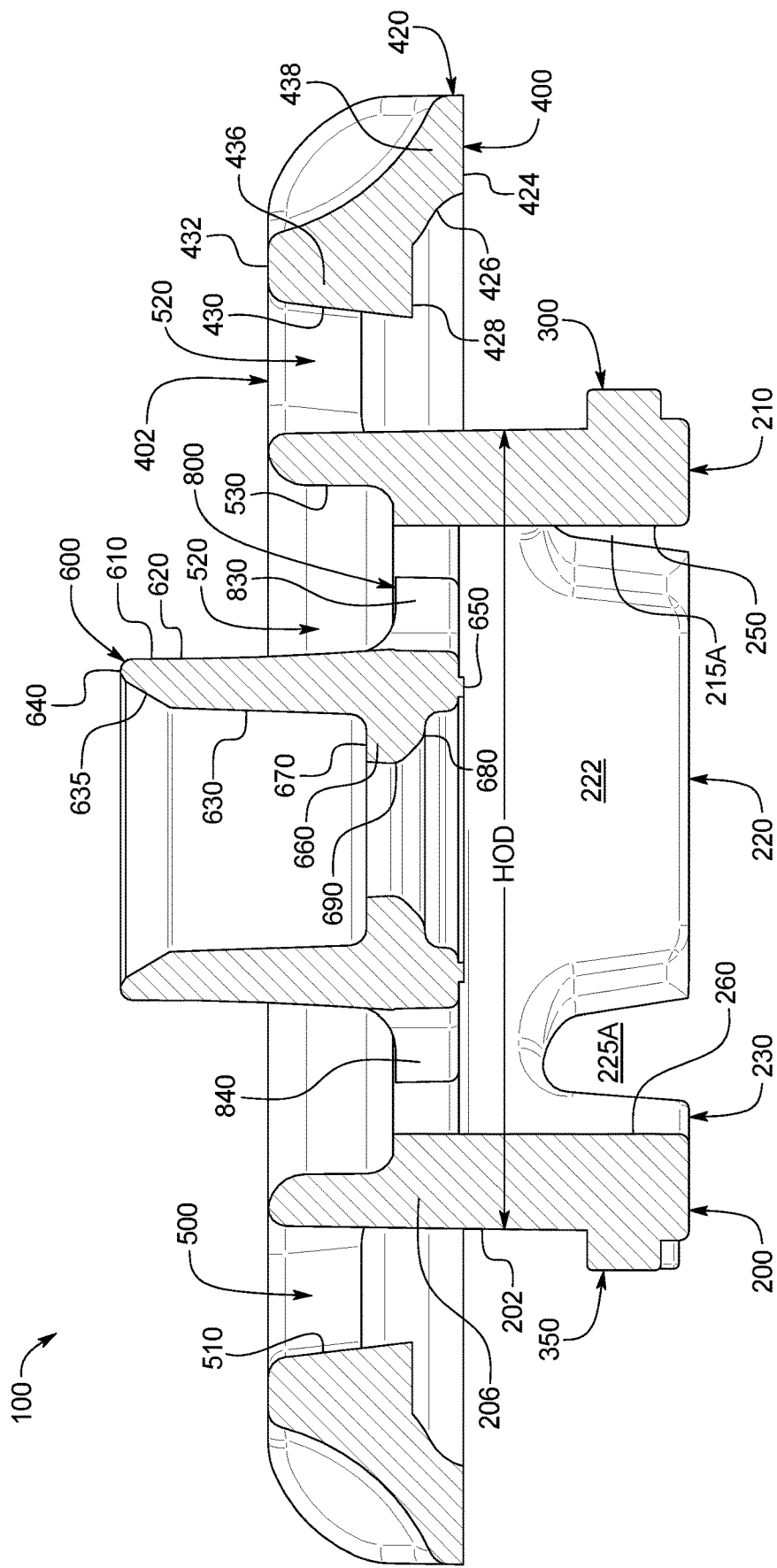
FIG. 12 is a cross-sectional view of the fuel cell adapter of FIG. 3, taken substantially along line 12-12 of FIG. 5.
Figure 13:
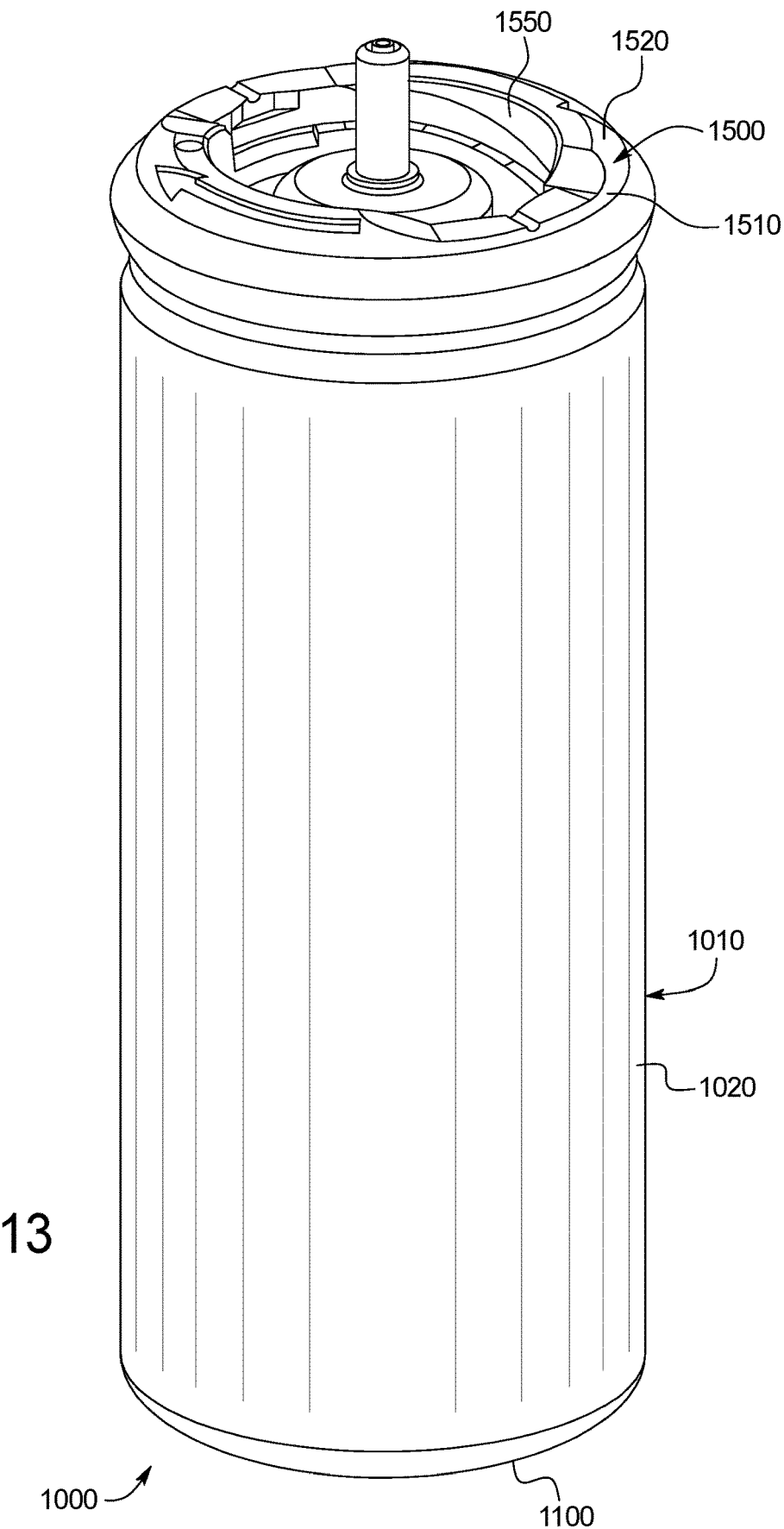
FIG. 13 is a perspective view of one example embodiment of a fuel cell and a sealing member attached to the fuel cell.
Figure 14:
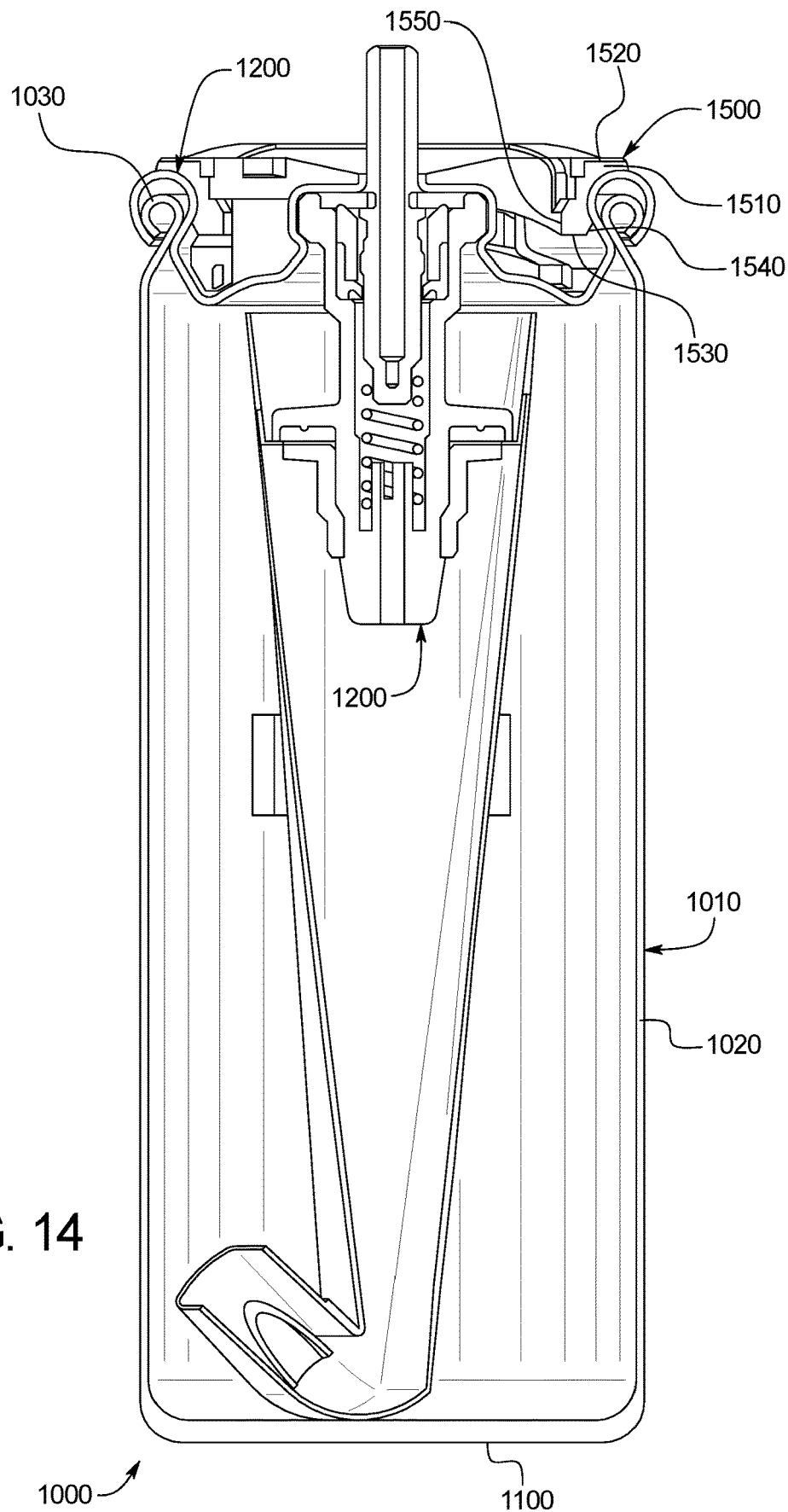
FIG. 14 is a cross-sectional view of the fuel cell and a sealing member attached to the fuel cell of FIG. 13.
Figure 15:
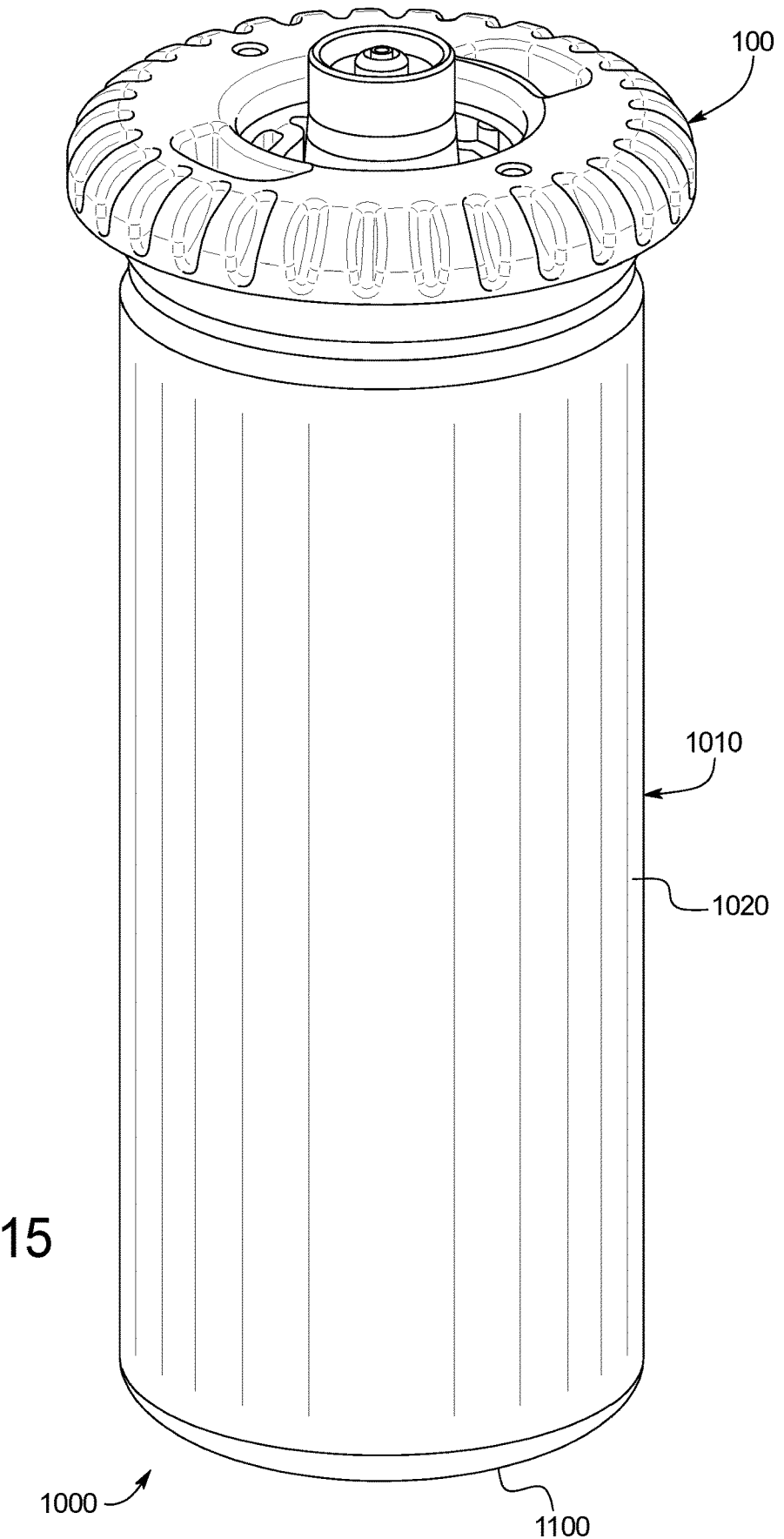
FIG. 15 is a perspective view of the fuel cell and a sealing member attached to the fuel cell of FIG. 13, and the fuel cell adapter of FIG. 3 attached to the sealing member and the fuel cell of FIG. 13.
Figure 16:
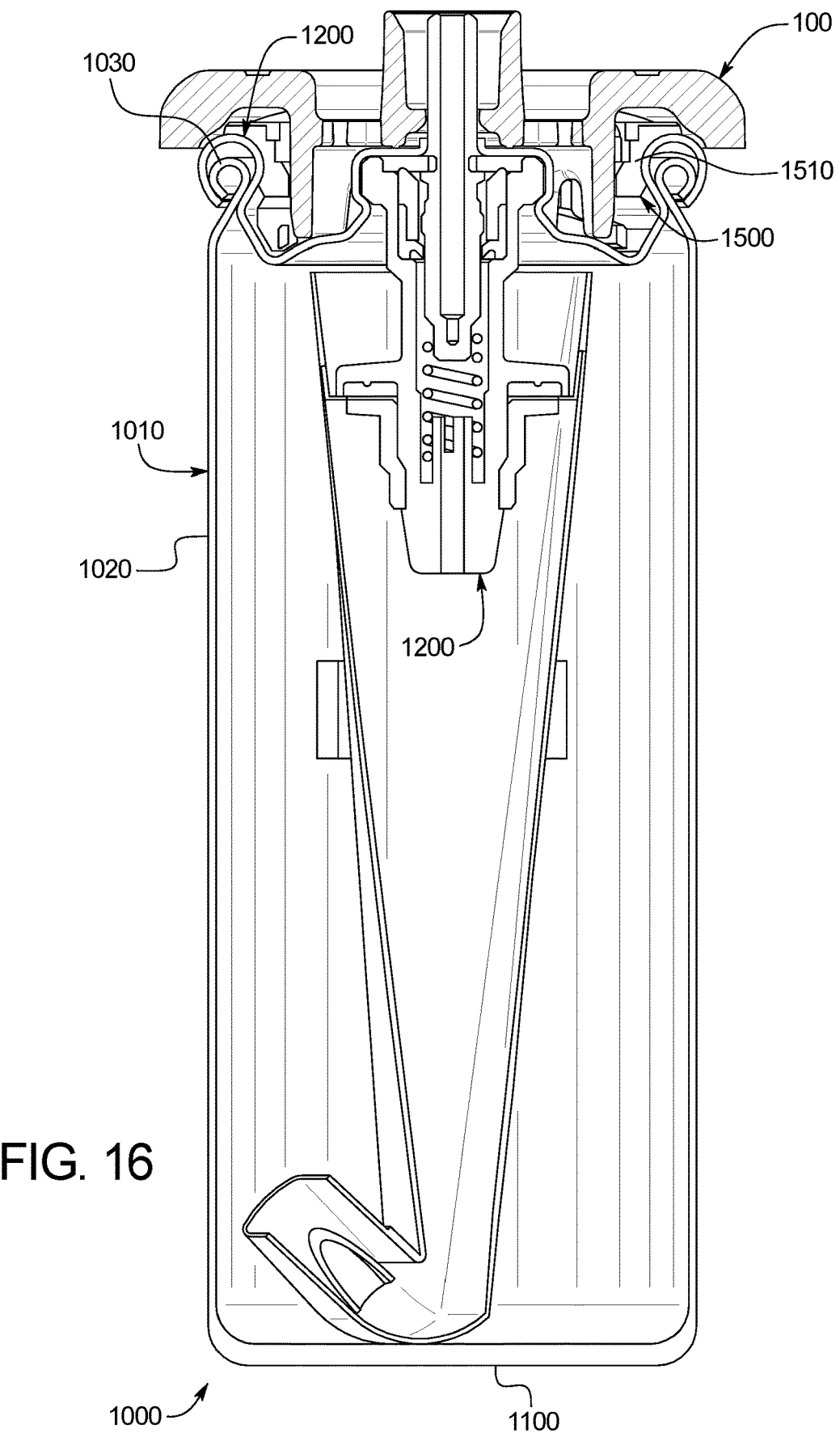
FIG. 16 is a cross-sectional view of the fuel cell and a sealing member attached to the fuel cell of FIG. 13, and the fuel cell adapter of FIG. 3 attached to the sealing member and the fuel cell of FIG. 13.

As best shown in FIGS. 11 and 12, the inner annular section 402 has: (1) a bottom surface 404; (2) an annular inner portion 406; (3) a top surface 408; and (4) an annular outer portion 409 integrally connected to and extending outwardly from the annular inner portion 406 and integrally connected to the annular outer section 420. The inner annular section 402 has a greater height than the inner annular section of the prior art adapter 10. In this illustrated example embodiment, the height of the inner annular section 402 of the flange 400 of the adapter 100 has been increased to 0.095±0.010 inches (0.2413±0.0254 cms) from the height of the inner annular section of the flange of the prior art adapter 10 that is 0.055±0.010 inches (0.1397±0.0254 cms). This increased height of the inner annular section 402 reduces flexing of the flange 400 and of the adapter 100 during tool operation and thus prevents: (1) the adapter 100 from popping off of the sealing member 1500 and the fuel cell 1000; (2) the adapter 100 from untwisting from the sealing member 1500 and the fuel cell 1000 (which could prevent the fuel cell 1000 from dosing fuel to the tool); and (3) the fuel cell 1000 from double dosing.

As best shown in FIGS. 11 and 12, the outer annular section 420 has: (1) a first bottom surface 424; (2) a second bottom surface 426; (3) an third bottom surface 428; (4) an inner surface 430; (5) a top surface 432; (6) an outer surface 434; (7) an inner annular portion 436 integrally connected to and extending outwardly from the inner annular section 402; and (8) an outer annular portion 438 integrally connected to and extending outwardly and downwardly from the inner annular portion 436. The outer annular section 420 has a greater height than the outer annular section of the prior art adapter 10. In this illustrated example embodiment, the height of the outer annular section 420 of the flange 400 of the adapter 100 has been increased to 0.200±0.005 inches (0.508±0.0127 cms) from the height of the outer annular section of the flange of the prior art adapter 10 that is 0.160±0.005 inches (0.4064±0.0127 cms). This increased height of the outer annular section 420 reduces flexing of the flange 400 and of the adapter 100 during tool operation and thus prevents: (1) the adapter 100 from popping off of the sealing member 1500 and the fuel cell 1000; (2) the adapter 100 from untwisting from the sealing member 1500 and the fuel cell 1000 (which could prevent the fuel cell 1000 from dosing fuel to the tool); and (3) the fuel cell 1000 from double dosing.

It should further be appreciated that with this increased height, the flange 400 has additional annular support and is thus configured to substantially reduce the upwardly and downward flexing of the flange 40 of the adapter 10 during usage. This reduction of flexing reduces the likelihood that the adapter will pop out of the sealing member 1500.

The locking flange 400 and particularly the outer annular section 420 also includes a plurality of evenly spaced-apart ridges (not labeled) and a plurality of evenly spaced-apart valleys (not labeled) extending between the ridges.

In this example embodiment, the ridges and the valleys are circumferentially spaced around the locking flange 400 and function with the larger flange 400 to provide a better grip for a user to grip the adapter 100 and to attach the adapter 100 to (and remove the adapter 100 from) the sealing member 1500 and the fuel cell 1000. In various example embodiments, these ridges and/or valleys are suitably textured such as (knurled) to provide a better grip for a user.

In this illustrated example embodiment, the locking flange 400 include two downwardly extending locking tabs (not labeled but best shown in FIG. 10) that are configured to engage slotted section of the sealing member 1500.

In this illustrated example embodiment, the collar 600 includes a generally cylindrical body 610 having: (1) an outer surface 620; (2) an inner surface 630; (3) a beveled top transition surface 635; (4) a top edge 640; and (5) a bottom edge 650. The body 610 also includes an inwardly extending annular lip 660 having: (a) a top surface 670; (b) a bottom surface 680; and (c) an inner surface 690. The collar 600 co-acts with the stem assembly 1400 of the fuel cell 1000 to facilitate fuel dosing from the fuel cell 1000 to the tool. It should be appreciated that the collar can be alternatively configured in accordance with the present disclosure.

In this illustrated example embodiment, the flexible suspension 800 includes four flexible arms 810, 820, 830, and 840 integrally connected to and extending between the hub 200 and the collar 600. The flexible suspension 800 connects the collar 600 to the hub 200. It should be appreciated that the flexible suspension can be alternatively configured in accordance with the present disclosure.

This combination of the above features of this illustrated example fuel cell adapter 100 is configured to provide a tight and secure connection between the adapter 100 and the sealing member 1500 connected to the fuel cell 1000. More specifically, the fuel cell adapter 100 is configured to be inserted into the sealing member 1500 and rotated in the sealing ember 1500 relative to the fuel cell 1000 to create a tight and secure connection between the sealing member 1500 and the adapter 100. Likewise, the fuel cell adapter 100 is configured to be pulled out of the sealing member 1500 via rotation in a reverse direction relative to the fuel cell 1000 to detach from the fuel cell adapter 100 from the sealing member 1500 and the fuel cell 1000.

It will be understood that modifications and variations may be effected without departing from the scope of the novel concepts of the present invention, and it is understood that this application is to be limited only by the scope of the claims.

The invention claimed is:

1. A combustion-powered fastener driving tool fuel cell adapter comprising:
  an annular hub including:
    (a) a tubular body having a tubular waist,
    (b) first, second, third, and fourth legs integrally connected to and extending downwardly from the tubular waist, the first, second, third, and fourth legs each integrally connected at an upper end to the tubular waist, the first, second, third, and fourth legs each having a lower free end, the second leg having a downwardly extending lead-in outer chamfer defined by an outer surface of the second leg, a bottom edge of the second leg, a first side surface of the second leg, and a second side surface of the second leg, the fourth leg having a downwardly extending lead-in outer chamfer defined by an outer surface of the fourth leg, a bottom edge of the fourth leg, a first side surface of the fourth leg, and a second side surface of the fourth leg, (c) a first reinforcement member integrally connected to and extending inwardly from an inner surface of the first leg, the first reinforcement member extending from the upper end of the first leg to the lower free end of the first leg, (d) a second reinforcement member integrally connected to and extending inwardly from an inner surface of the third leg, the second reinforcement member extending from the upper end of the third leg to the lower free end of the third leg, (e) a first locking member integrally connected to and extending outwardly from an outer surface of the first leg, and (f) a second locking member integrally connected to and extending outwardly from an outer surface of the third leg;

an annular locking flange integrally connected to and extending radially outwardly from the hub;

an annular collar integrally connected to and longitudinally extending upwardly from the hub; and a flexible suspension integrally connecting the collar to the hub.

2. The combustion-powered fastener driving tool fuel cell adapter of claim 1, wherein the hub, the locking flange, the collar, and the flexible suspension are monolithically formed.

3. The combustion-powered fastener driving tool fuel cell adapter of claim 1, wherein the first, second, third, and fourth legs define an outer diameter of the hub being 0.843±0.002 inches.

4. The combustion-powered fastener driving tool fuel cell adapter of claim 1, wherein the first leg and the third leg each do not have a downwardly extending lead-in outer chamfer.

5. The combustion-powered fastener driving tool fuel cell adapter of claim 1, wherein the second leg and the fourth leg each do not include an inwardly extending reinforcement member.

6. The combustion-powered fastener driving tool fuel cell adapter of claim 1, wherein the first, second, third, and fourth legs define a plurality of slots that each have a slot height of 0.150±0.005 inches.

7. The combustion-powered fastener driving tool fuel cell adapter of claim 1, wherein the first, second, third, and fourth legs include additional supporting sections each having a height of 0.185±0.010 inches.

8. The combustion-powered fastener driving tool fuel cell adapter of claim 1, wherein the first reinforcement member is semi-cylindrical and the second reinforcement member is semi-cylindrical.

9. The combustion-powered fastener driving tool fuel cell adapter of claim 1, wherein each of the first and second locking members includes a foot and a toe, wherein each of the first and second locking members has: (a) a first bottom surface; (b) a first side surface; (c) a first top surface; (d) a second top surface; (e) a second side surface; (f) a second bottom surface; (g) a third bottom surface; (h) a fourth bottom surface; and (i) an outer surface, wherein the outer surface and the second bottom surface do not define a chamfer.

10. The combustion-powered fastener driving tool fuel cell adapter of claim 1, wherein the locking flange includes: (a) an inner annular section integrally connected to and extending radially outwardly from the hub; and (b) an outer annular section integrally connected to and extending radially outwardly from the inner annular section, wherein the height of the inner annular section is 0.095±0.010 inches and the height of the outer annular section is 0.200±0.005 inches.

11. The combustion-powered fastener driving tool fuel cell adapter of claim 1, wherein the locking flange is configured to minimize upward and downward flexing.

12. A combustion-powered fastener driving tool fuel cell adapter comprising:

an annular hub including:
  (a) a tubular body having a tubular waist,
  (b) first, second, third, and fourth legs integrally connected to and extending downwardly from the tubular waist, the first, second, third, and fourth legs each integrally connected at an upper end to the tubular waist, the first, second, third, and fourth legs each having a lower free end,
  (c) a first reinforcement member integrally connected to and extending inwardly from an inner surface of the first leg, the first reinforcement member extending from the upper end of the first leg to the lower free end of the first leg,
  (d) a second reinforcement member integrally connected to and extending inwardly from an inner surface of the third leg, the second reinforcement member extending from the upper end of the third leg to the lower free end of the third leg,
  (e) a first locking member integrally connected to and extending outwardly from an outer surface of the first leg, and
  (f) a second locking member integrally connected to and extending outwardly from an outer surface of the third leg;

an annular locking flange integrally connected to and extending radially outwardly from the hub, wherein the locking flange is configured to minimize upward and downward flexing;

an annular collar integrally connected to and longitudinally extending upwardly from the hub; and a flexible suspension integrally connecting the collar to the hub.

13. The combustion-powered fastener driving tool fuel cell adapter of claim 12, wherein the locking flange includes: (a) an inner annular section integrally connected to and extending radially outwardly from the hub; and (b) an outer annular section integrally connected to and extending radially outwardly from the entire inner annular section, wherein the height of the inner annular section is 0.095±0.010 inches and the height of the outer annular section is 0.200±0.005 inches.

14. A combustion-powered fastener driving tool fuel cell adapter comprising:

an annular hub including:
  (a) a tubular body having a tubular waist,
  (b) first, second, third, and fourth legs integrally connected to and extending downwardly from the tubular waist, the first, second, third, and fourth legs each integrally connected at an upper end to the tubular waist, the first, second, third, and fourth legs each having a lower free end, the second leg having a downwardly extending lead-in outer chamfer defined by an outer surface of the second leg, a bottom edge of the second leg, a first side surface of the second leg, and a second side surface of the second leg, the fourth leg having a downwardly extending lead-in outer chamfer defined by an outer surface of the fourth leg, a bottom edge of the fourth leg, a first side surface of the fourth leg, and a second side surface of the fourth leg, (c) a first semi-cylindrical reinforcement member integrally connected to and extending inwardly from an inner surface of the first leg, the first semi-cylindrical reinforcement member extending from the upper end of the first leg to the lower free end of the first leg, (d) a second semi-cylindrical reinforcement member integrally connected to and extending inwardly from an inner surface of the third leg, the second semi-cylindrical reinforcement member extending from the upper end of the third leg to the lower free end of the third leg, (e) a first locking member integrally connected to and extending outwardly from an outer surface of the first leg, and (f) a second locking member integrally connected to and extending outwardly from an outer surface of the third leg, wherein the first leg and the third leg each do not have a downwardly extending lead-in outer chamfer, and wherein the second leg and the fourth leg each do not include an inwardly extending reinforcement rib;

an annular locking flange integrally connected to and extending radially outwardly from the hub, wherein the locking flange includes: (a) an inner annular section integrally connected to and extending radially outwardly from the hub; and (b) an outer annular section integrally connected to and extending radially outwardly from the entire inner annular section, wherein the locking flange is configured to minimize upwardly and downward flexing;

an annular collar integrally connected to and longitudinally extending upwardly from the hub; and a flexible suspension integrally connecting the collar to the hub.

15. The combustion-powered fastener driving tool fuel cell adapter of claim 14, wherein the hub, the locking flange, the collar, and the flexible suspension are monolithically formed.

16. The combustion-powered fastener driving tool fuel cell adapter of claim 14, wherein the first, second, third, and fourth legs define an outer diameter of the hub being 0.843±0.002 inches.

17. The combustion-powered fastener driving tool fuel cell adapter of claim 14, wherein the first, second, third, and fourth legs define a plurality of slots that each have a slot height of 0.150±0.005 inches.

18. The combustion-powered fastener driving tool fuel cell adapter of claim 13, wherein the first, second, third, and fourth legs include additional supporting sections each having a height of 0.185±0.010 inches.

19. The combustion-powered fastener driving tool fuel cell adapter of claim 13, wherein each of the first and second locking members includes a foot and a toe, wherein each of the first and second locking members has: (a) a first bottom surface; (b) a first side surface; (c) a first top surface; (d) a second top surface; (e) a second side surface; (f) a second bottom surface; (g) a third bottom surface; (h) a fourth bottom surface; and (i) an outer surface, wherein the outer surface and the second bottom surface do not define a chamfer.

20. The combustion-powered fastener driving tool fuel cell adapter of claim 14, wherein the wherein the height of the inner annular section is 0.095±0.010 inches and the height of the outer annular section is 0.200±0.005 inches.

* * * * *